(12) United States Patent
Ashlock (10) Patent No.: US 11,888,719 B2
(45) Date of Patent: Jan. 30, 2024

(54) END-TO-END DISTRIBUTED NETWORK TRACING INVOLVING CLOUD EDGE NETWORKS

(71) Applicant: Cisco Technology, Inc., San Jose, CA (US)

(72) Inventor: Hans F. Ashlock, Berkeley, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/743,917

(22) Filed: May 13, 2022

(65) Prior Publication Data

US 2023/0370355 A1 Nov. 16, 2023

(51) Int. Cl.
  *H04L 43/10* (2022.01)
  *H04L 43/062* (2022.01)
  *H04L 43/0817* (2022.01)

(52) U.S. Cl.
  CPC .......... *H04L 43/10* (2013.01); *H04L 43/062* (2013.01); *H04L 43/0817* (2013.01)

(58) Field of Classification Search
  CPC .... H04L 43/10; H04L 43/062; H04L 43/0817
  USPC ...................................................... 709/224
  See application file for complete search history.

(56) References Cited

U.S. PATENT DOCUMENTS

| 10,608,931 | B1 * | 3/2020 | Kumar ............... H04L 12/4641 |
| 11,665,078 | B1 | 5/2023 | Ashlock et al. |
| 2006/0129885 | A1 | 6/2006 | Bozak et al. |
| 2007/0192474 | A1 | 8/2007 | Decasper et al. |
| 2007/0266148 | A1 | 11/2007 | Ruiz et al. |
| 2012/0170470 | A1 | 7/2012 | Duchenay et al. |
| 2014/0297846 | A1 | 10/2014 | Hoja et al. |
| 2016/0352608 | A1 | 12/2016 | Cornell et al. |

(Continued)

FOREIGN PATENT DOCUMENTS

WO  2020229635 A1  11/2020

OTHER PUBLICATIONS

OpenTelemetry, "Data Sources", Last modified Nov. 12, 2021, retrieved from Internet Apr. 4, 2022, 4 pages; https://opentelemetry.io/docs/concepts/data-sources/#traces.

(Continued)

*Primary Examiner* — Meng Vang
(74) *Attorney, Agent, or Firm* — Edell, Shapiro & Finnan, LLC (57) ABSTRACT

Techniques are described for generating an end-to-end distributed network trace involving cloud edge networks. In one example, a cloud or datacenter environment obtains, from an edge node in a cloud edge network, one or more network communications that include a correlation identifier associated with the one or more network communications and an identifier of the edge node. Based on the identifier of the edge node, the cloud or datacenter environment provides a network probe to the edge node. The cloud or datacenter environment obtains, from the edge node, telemetry data that is generated responsive to the network probe. The cloud or datacenter environment provides the telemetry data and the correlation identifier to an aggregation server that is configured to, based on the correlation identifier, aggregate the telemetry data with further telemetry data to generate an end-to-end distributed network trace associated with the one or more network communications.

20 Claims, 5 Drawing Sheets

(56) References Cited

U.S. PATENT DOCUMENTS

| | | | |
|---|---|---|---|
| 2017/0005887 A1 | 1/2017 | Lad et al. | |
| 2017/0076479 A1 | 3/2017 | Benavides et al. | |
| 2017/0161167 A1* | 6/2017 | Obermiller | G06F 16/178 |
| 2017/0337122 A1 | 11/2017 | Bolajwar et al. | |
| 2018/0077026 A1 | 3/2018 | Li et al. | |
| 2018/0083849 A1 | 3/2018 | Droux et al. | |
| 2019/0045412 A1 | 2/2019 | Shivam et al. | |
| 2020/0195735 A1 | 6/2020 | Greifeneder et al. | |
| 2020/0328952 A1 | 10/2020 | Makwarth et al. | |
| 2020/0379875 A1 | 12/2020 | Krishnaswamy et al. | |
| 2021/0019209 A1 | 1/2021 | Krishnaswamy et al. | |
| 2021/0135967 A1* | 5/2021 | Iorga | H04L 41/0886 |
| 2022/0050902 A1 | 2/2022 | Hulick, Jr. | |
| 2022/0058042 A1* | 2/2022 | Vanjare | H04L 41/0895 |
| 2022/0121556 A1* | 4/2022 | Guim Bernat | G06F 11/3476 |
| 2022/0174012 A1 | 6/2022 | Deshmukh et al. | |
| 2022/0210035 A1* | 6/2022 | Hendrickson | H04L 43/10 |
| 2022/0217116 A1* | 7/2022 | Schachter | H04L 43/062 |
| 2022/0222359 A1 | 7/2022 | Doshi et al. | |

OTHER PUBLICATIONS

MDN Web Docs, "X-Forwarded-For", Last modified: Apr. 18, 2022, retrieved from Internet Apr. 25, 2022, 7 pages; https://developer.mozilla.org/en-US/docs/Web/HTTP/Headers/X-Forwarded-For.

MDN Web Docs, "X-Forwarded-Proto", Last modified: Apr. 18, 2022, retrieved from Internet Apr. 25, 2022, 4 pages; https://developer.mozilla.org/en-US/docs/Web/HTTP/Headers/X-Forwarded-Proto.

Wikipedia, "List of HTTP header fields", last edited Apr. 2, 2022, retrieved from Internet Apr. 4, 2022, 11 pages; https://en.wikipedia.org/wiki/List_of_HTTP_header_fields.

Kayce Basques et al., "Network features reference", Chrome Developers, published Apr. 13, 2015, updated Apr. 1, 2022, retrieved from Internet Apr. 4, 2022, 44 pages; https://developer.chrome.com/docs/devtools/network/reference.

Datadog, "Synthetic Monitoring—API and Browser Testing", Datadog 2022, Mar. 7, 2022, 7 pages; https://www.datadoghq.com/product/synthetic-monitoring/.

Salman Taherizadeh et al., "Monitoring self-adaptive applications within edge computing frameworks: A state-of-the-art review", Available online Nov. 2, 2017, Elsevier Inc., The Journal of Systems and Software 136 (2018), 20 pages.

Datadog, "What is Distributed Tracing? How it Works & Use Cases", Datadog 2022, Mar. 9, 2022, 8 pages; https://www.datadoghq.com/knowledge-center/distributed-tracing/.

Open Telemetry Docs, "Tracing," Mar. 9, 2022, Lightstep, Inc.; https://opentelemetry.lightstep.com.

OpenTelemetry, "Resource Semantic Conventions", 7 pages; retrieved from Internet Apr. 4, 2022; https://opentelemetry.io/docs/reference/specification/resource/semantic_conventions/.

W3C, "Trace Context", Nov. 23, 2021, 17 pages; https://www.w3.org/TR/trace-context/#traceparent-header.

* cited by examiner

END-TO-END DISTRIBUTED NETWORK TRACING INVOLVING CLOUD EDGE NETWORKS

TECHNICAL FIELD

The present disclosure relates to computer networking.

BACKGROUND

Users may connect to an application through a browser/mobile device via the Internet. Applications are increasingly leveraging edge compute network services (e.g., Content Delivery Network (CDN) services, Distributed Denial-of-Service (DDoS) mitigation services, Web Application Firewalls (WAFs), etc.). These edge services are hosted in edge cloud networks remote from an application origin server where the application is hosted. Edge services may improve application performance by, for example, optimizing the locations of edge compute nodes and the performance of cloud edge networks.

DESCRIPTION OF EXAMPLE EMBODIMENTS

Overview

Techniques are described herein for generating an end-to-end distributed network trace involving cloud edge networks. In one example embodiment, a cloud or datacenter environment obtains, from an edge node in a cloud edge network, one or more network communications that include a correlation identifier associated with the one or more network communications and an identifier of the edge node. Based on the identifier of the edge node, the cloud or datacenter environment provides a network probe to the edge node. The cloud or datacenter environment obtains, from the edge node, telemetry data that is generated responsive to the network probe. The cloud or datacenter environment provides the telemetry data and the correlation identifier to an aggregation server that is configured to, based on the correlation identifier, aggregate the telemetry data with further telemetry data to generate an end-to-end distributed network trace associated with the one or more network communications.

EXAMPLE EMBODIMENTS

Figure 1:
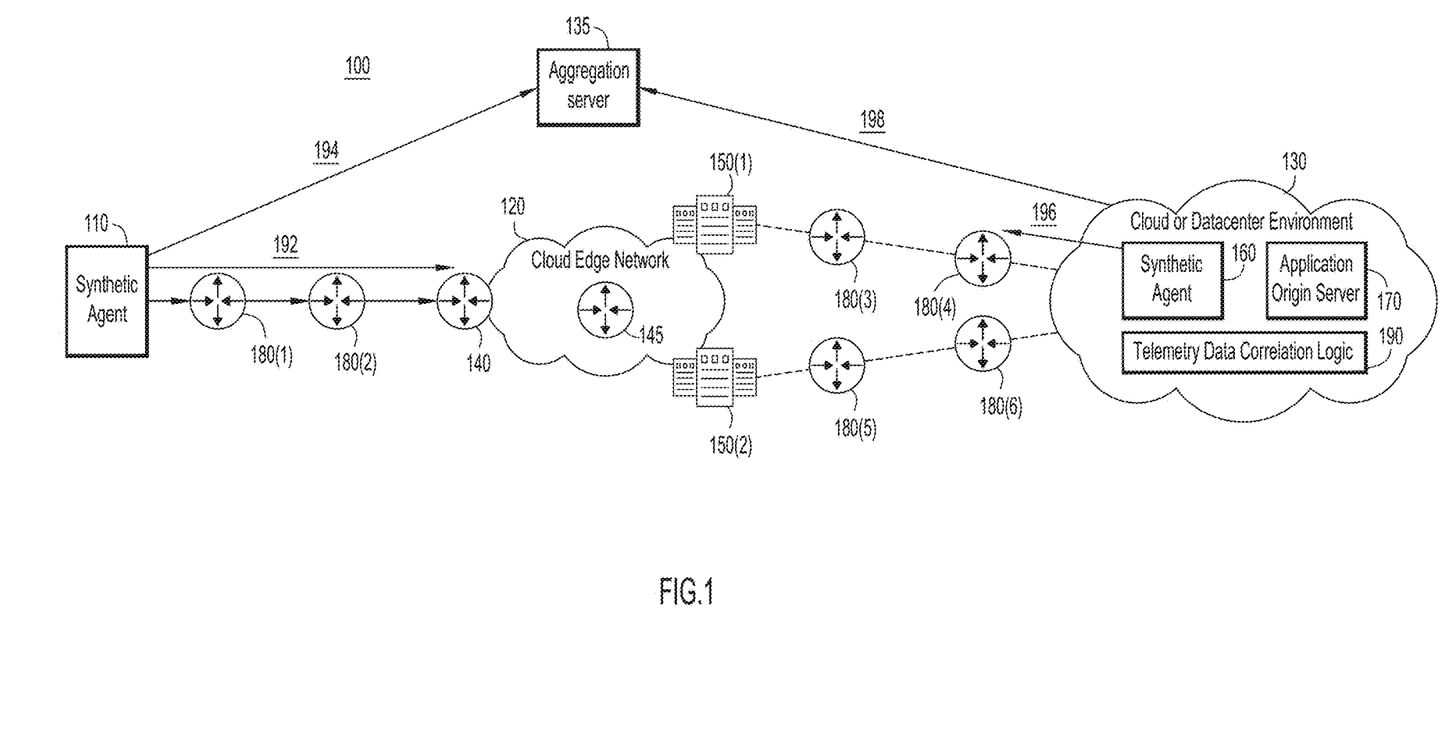
FIG. 1 illustrates a system configured for end-to-end distributed network tracing involving cloud edge networks, according to an example embodiment.

FIG. 1 illustrates a system 100 configured for end-to-end distributed network tracing involving cloud edge networks, according to an example embodiment. System 100 includes synthetic agent 110, cloud edge network 120, cloud or datacenter environment 130, and aggregation server 135. Cloud edge network 120 includes application front door 140, intermediate node 145, and edge nodes 150(1) and 150(2). Cloud or datacenter environment 130 includes synthetic agent 160 and hosts application origin server 170. System 100 also includes network nodes 180(1)-180(6) (e.g., routers, switches, etc.) configured to transmit network communications between synthetic agent 110, cloud edge network 120, and cloud or datacenter environment 130.

[Imo] Cloud or datacenter environment 130 may be an environment configured to run a Kubernetes® system. The Kubernetes system may be an open-source system for automating deployment, scaling, and management of containerized applications. Application origin server 170 may include one or more core application servers/services configured to host a web or mobile application and serve up web pages and application code to clients (e.g., browsers or mobile devices). Application origin server 170 may be configured to host and serve up web pages and application code to clients.

Cloud edge network 120 may be configured to provide one or more edge services on the application. In one example, cloud edge network 120 may include a Content Delivery Network (CDN) that caches/hosts certain portions of client-side application code in application front door 140. Like application origin server 170, application front door 140 may be configured to host and serve up web pages and application code to clients. Application front door 140 may store the cached content at a location that is topologically closer to clients than application origin server 170. Thus, application front door 140 may provide the cached content to a client faster that application origin server 170. Application front door 140 may query application origin server 170 as needed.

Cloud edge network 120 may provide any suitable edge service in addition to or instead of CDN services, such as Distributed Denial-of-Service (DDoS) mitigation services, Web Application Firewalls (WAFs), etc. A DDoS mitigation service may be configured to detect a DDoS attack and, in response, change where the application is hosted to avoid the DDoS attack. A WAF may provide web-based security services.

Edge nodes 150(1) and 150(2) may be servers running in cloud edge network 120 configured to make back-end requests to application origin server 170 on behalf of cloud edge network 120 and/or an end-user initiating a web request. Thus, edge nodes 150(1) and 150(2) may dynamically fetch application data from application origin server 170.

Synthetic agents 110 and 160 may be dedicated test devices, such as agents configured for implementation with the ThousandEyes® software monitoring platform. The ThousandEyes software monitoring platform may provide visibility and enable actions to maintain and optimize digital services, such as application experience, hop-by-hop network path, and performance. Synthetic agent 160 may be enhanced with additional capabilities described herein.

Today, a synthetic agent can use existing synthetic probing technology to obtain hop-by-hop network performance data relating to applications from an end-user perspective, but only if there is no intervening cloud edge network between the synthetic agent and the application. As a result, existing synthetic probing technology cannot provide visibility into the path or performance beyond application front door 140. More specifically, the edge service(s) on cloud edge network 120 act as proxies that handle end-user requests and make calls to application origin server 170 on behalf of the end-user, but proxying occurs at Layer 7 (the application layer), which prevents existing synthetic probing technology from probing beyond application front door 140.

As a result, existing synthetic probing technology cannot provide full, end-to-end network visibility (e.g., a complete trace) from synthetic agent 110 to the application origin server 170. That is, existing synthetic probing technology would lose visibility of the middle-mile path from cloud edge network 120 to application origin server 170 hosted in cloud or datacenter environment 130, leaving a key visibility blind-spot between cloud edge network 120 and application origin server 170. This limits the ability of existing synthetic probing technology to identify network performance issues that may occur between cloud edge network 120 and application origin server 170.

Furthermore, configuring a synthetic agent in cloud or datacenter environment 130 to perform fixed synthetic probing to cloud edge network 120 would be an unreliable solution to provide insight into the 'blind-spot' between cloud edge network 120 and application origin server 170. Because edge nodes 150(1) and 150(2) dynamically fetch application data from application origin server 170, the synthetic agent operating in cloud or datacenter environment 130 would be unable to determine which of edge nodes 150(1) and 150(2) to probe at any given time using fixed probing.

Accordingly, to bridge the visibility gap in the end-to-end connection between synthetic agent 110 and application origin server 170, cloud or datacenter environment 130 is provided with telemetry data correlation logic 190. Briefly, telemetry data correlation logic 190 may cause cloud or datacenter environment 130 to perform operations to enable path discovery and dynamic monitoring and analysis of the network segments between cloud edge network 120 and cloud or datacenter environment 130. Providing visibility to these network segments may allow full-stack observability tools to provide more accurate end-to-end visibility for optimizing and troubleshooting application performance.

In one example, synthetic agent 110 may generate one or more network communications that target a Uniform Resource Locator (URL) of application origin server 170. The one or more network communications may comprise a synthetic test payload including synthetic network probes and a synthetic web (e.g. Hypertext Transfer Protocol (HTTP)) request injected with a correlation identifier associated with the one or more network communications. The one or more network communications may also include metadata of synthetic agent 110. The metadata may include an identifier (e.g., name and/or Internet Protocol (IP) address) of synthetic agent 110, a location (e.g., a geolocation, such as city, state, country, metro region, etc. and/or a geotag, such as latitude/longitude) of synthetic agent 110, a service provider (e.g., network provider or Internet Service Provider (ISP)) of synthetic agent 110, host/provider network of synthetic agent 110, etc.

At operation 192, the one or more network communications may proceed, via network nodes 180(1) and 180(2), to application front door 140. Responsive to the network probe(s), synthetic agent 110 may collect telemetry data (e.g., hop-by-hop network data) for the network path between synthetic agent 110 and application front door 140. Synthetic agent 110 may further tag the telemetry data with the correlation identifier, and, at operation 194, provide the tagged telemetry data to aggregation server 135.

Cloud edge network 120 obtains the one or more network communications, including the correlation identifier, at application front door 140. Cloud edge network 120 forwards the one or more network communications from application front door 140 to edge node 150(1) or 150(2) via intermediate node 145. In this example, cloud edge network 120 forwards the one or more network communications from application front door 140 to edge node 150(1). Upon receiving the one or more network communications, edge node 150(1) inserts an identifier of edge node 150(1) (e.g. an IP address of edge node 150(1)) and forwards the one or more network communications, including the correlation identifier and the identifier of edge node 150(1), to cloud or datacenter environment 130.

Application origin server 170 may obtain, from edge node 150(1), the one or more network communications, including the correlation identifier and the identifier of edge node 150(1). The one or more network communications may prompt application origin server 170 to locally generate one or more web server logs that identify the correlation identifier, the identifier of edge node 150(1), the identifier(s) (e.g., IP address(es)) of intermediate node 145, any metadata (e.g., the location and/or identifier of synthetic agent 110), etc.

Synthetic agent 160 may be enhanced to perform functions of a "smart agent," such as parsing application requests, correlating telemetry data with existing tests, and dynamically creating new tests to the correct cloud edge IP addresses. Synthetic agent 160 may leverage real-time streaming and parsing of the web server logs in order to extract the correlation identifier and the identifier of edge node 150(1) from the log(s). Based on the correlation identifier, synthetic agent 160 may dynamically generate a network probe (e.g., a synthetic network probe) and, at operation 196, provide the network probe to edge node 150(1).

Synthetic agent 160 may obtain, from edge node 150(1), telemetry data that is generated responsive to the network probe. The telemetry data may include hop-by-hop network data for the network path between edge node 150(1) and cloud or datacenter environment 130. Synthetic agent 160 may tag the telemetry data with the same correlation identifier obtained from synthetic agent 110 via the one or more network communications.

At operation 198, cloud or datacenter environment 130 may provide the telemetry data for the network path between edge node 150(1) and cloud or datacenter environment 130, and the correlation identifier, to aggregation server 135. Thus, aggregation server 135 may be configured to obtain, from synthetic agent 160, the telemetry data for the network path between edge node 150(1) and cloud or datacenter environment 130. Aggregation server 135 may also be configured to obtain, from synthetic agent 110, the telemetry data for the network path between synthetic agent 110 and edge node 150(1).

Aggregation server 135 may be further configured to, based on the correlation identifier, aggregate the telemetry data for the network path between edge node 150(1) and cloud or datacenter environment 130 with the telemetry data for the network path between synthetic agent 110 and edge node 150(1). Using the correlation identifier, aggregation server 135 may correlate the telemetry data obtained from synthetic agent 160 with the telemetry data obtained from the synthetic web request sent from synthetic agent 110 to cloud edge network 120.

Using the aggregated telemetry data, aggregation server 135 may generate an end-to-end distributed network trace associated with the one or more network communications. In one example, aggregation server 135 may stitch together network probe/path telemetry data (e.g., the two sets of probe data, one from synthetic agent 110 and the other from synthetic agent 160) to create a single end-to-end network path trace. Aggregation server 135 may stitch together any suitable number of network probe/path data sets using the common correlation identifier to create a complete end-to-end network trace. Thus, full path awareness may be achieved, including from synthetic agent 110 to cloud edge network 120 and from cloud edge network 120 to application origin server 170.

In one example, aggregation server 135 may also obtain, associated with the correlation identifier, metadata of synthetic agent 110. The metadata may include an identifier of synthetic agent 110, a location of synthetic agent 110, a service provider of synthetic agent 110, host/provider network of synthetic agent 110, etc. Aggregation server 135 may associate the metadata of synthetic agent 110 with, and thereby enrich the end-to-end distributed network trace.

Based on the telemetry data, aggregation server 135 may automatically implement a network configuration change in cloud or datacenter environment 130. Aggregation server 135 may use the telemetry data to drive configuration changes in application origin server 170 to optimize configuration and how cloud edge network 120 makes connections/requests back to application origin server 170. In one example, the level of service provided by cloud edge network 120 may be automatically adjusted. For instance, if the application has a standard service level that contributes to high latency between cloud edge network 120 and cloud or datacenter environment 130, the application may be automatically upgraded to a premium tunneled connection between cloud edge network 120 and cloud or datacenter environment 130. The telemetry data may also/alternatively be used to automate configuration and execution of synthetic network tests from application origin server 170 to cloud edge network 120. This may, in turn, provide improved visibility and performance of the middle-mile network path between cloud edge network 120 and cloud or datacenter environment 130.

In one example, a synthetic test system may be employed with a global set of synthetic agents that generates synthetic tests and web application traffic from global locations to application origin server 170. For instance, the process described in connection with FIG. 1 may be repeated for any number of geographically dispersed/remote/external synthetic agents. These processes may be initiated by multiple synthetic agents sending synthetic web requests and/or synthetic network probes toward application origin server. Ultimately, aggregation server 135 may produce multiple end-to-end distributed network traces, each associated with the location of a respective synthetic agent.

Aggregation server 135 may display the end-to-end distributed network trace, thereby creating a single end-to-end network path view, to enable the owner of the application to view the end-to-end distributed network trace(s). In one example, the owner of the application may view multiple end-to-end distributed network traces from global vantage points. The owner may parse the collection of end-to-end distributed network traces based on the synthetic requests (e.g., filtering out other production/user traffic) and compare performance for different geographic regions. The display may also/alternatively enable the owner to observe how the trace topology changes over time for a given agent (e.g., synthetic agent 110). The end-to-end distributed network trace(s) may be displayed with any suitable network path data (e.g., metadata) associated with monitoring a particular application.

Figure 2:
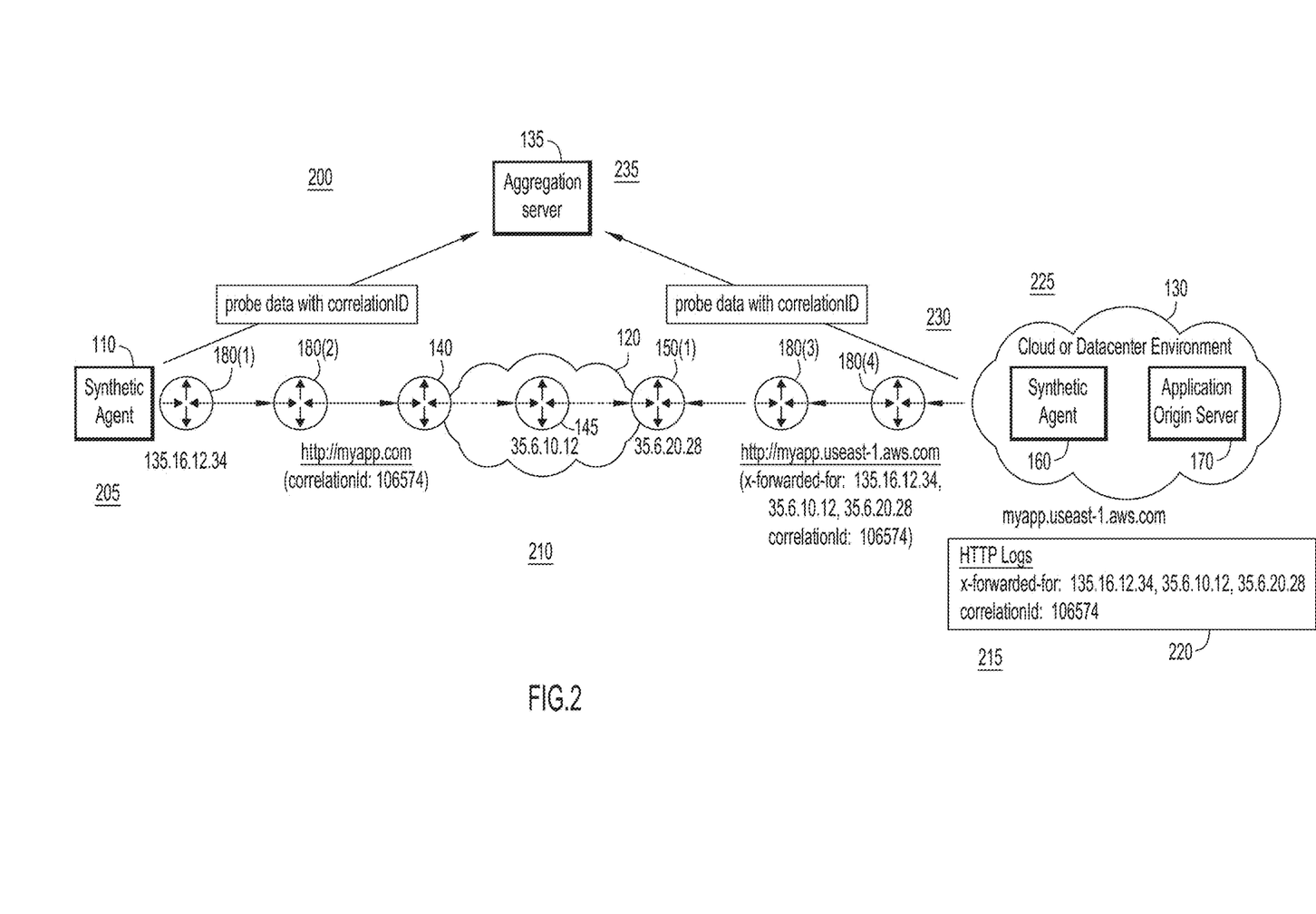
FIG. 2 illustrates a system configured for end-to-end distributed network tracing involving cloud edge networks using one or more headers, according to an example embodiment.

FIG. 2 illustrates a system 200 configured for end-to-end distributed network tracing involving cloud edge networks using one or more headers, according to an example embodiment. System 200 includes synthetic agent 110, cloud edge network 120, cloud or datacenter environment 130, aggregation server 135, and network nodes 180(1)-180(4). In this example, synthetic agent 110, intermediate node 145, and edge node 150(1) have IP addresses of 135.16.12.34, 35.6.10.12, and 35.6.20.28, respectively. Application front door 140 may be reachable via the primary URL "myapp.com.," and application origin server 170 may be reachable via the URL "myapp.useast-1.aws.com."

At operation 205, synthetic agent 110 generates one or more network communications. The one or more network communications may include a synthetic web/application request and/or a synthetic network probe. In one example, synthetic agent 110 may simultaneously generate the synthetic web request and the synthetic network probe. The synthetic web request and/or synthetic network probe may target the application, e.g., "http://myapp.com."

Synthetic agent 110 may inject a correlation identifier (e.g., a test identifier) in a header of the synthetic web request. In this example, the value for the correlation identifier is "106574." This value may be injected/included in a custom x-correlationId HTTP header of the form {"x-correlationId: <unique ID>"}. Synthetic agent 110 may also inject one or more headers in the one or more network communications. One header (e.g., an x-forwarded-for header) may be configured to identify which servers in system 200 have handled a proxied HTTP request. Another header (e.g., an x-forwarded-proto header) may be configured to indicate the protocol used by synthetic agent 110 to connect to application front door 140 via the synthetic web request.

Synthetic agent 110 may send the one or more network communications to application front door 140 via a provider network (e.g., via network nodes 180(1) and 180(2)). The synthetic network probe may generate network probe data, and the synthetic web request may generate web request data. The web request data may indicate the performance of the application, and the network probe data may indicate the network path from synthetic agent 110 to application front door 140. Synthetic agent 110 may record and tag the network probe data with the correlation identifier.

At operation 210, cloud edge network 120 may receive the synthetic web request (including the x-forwarded-proto header and the x-correlationID header) and forward it from application front door 140 to edge node 150(1), appending in the x-forwarded-for header the IP addresses of proxy nodes (e.g., intermediate node 145 and edge node 150(1)). In this example, the x-forwarded-for header may be injected by synthetic agent 110; however, in other examples, cloud edge network 120 (e.g., application front door 140) may be configured to automatically inject the x-forwarded-for header in proxy requests.

The presence of the x-forwarded-for header may cause each proxy node to append its respective IP address to the x-forwarded-for header. For example, application front door 140 may forward the synthetic web request to intermediate node 145, which may insert its IP address (35.6.10.12) into the x-forwarded-for header. Intermediate node 145 may in turn forward the synthetic web request to edge node 150(1), which may insert its IP address (35.6.20.28) into the x-forwarded-for header. The x-forwarded-for header may take the form <client>, <proxy1>, <proxy2>, etc. (e.g., <135.16.12.34>, <35.6.10.12>, <35.6.20.28>, that is, the IP address of synthetic agent 110 listed first, followed by the ordered IP addresses of the proxy nodes). In some examples, cloud edge network may be specifically configured to enable handling of the x-forwarded-for header.

Edge node 150(1) may forward the synthetic web request (including the x-forwarded-proto header, x-forwarded-for header, and the x-correlationId header) to application origin server 170, via network nodes 180(3) and 180(4). At operation 215, application origin server 170 obtains the synthetic web request and handles the synthetic web request accordingly. In one example, application origin server 170 collects/extracts the values from the x-forwarded-proto header, the x-forwarded-for header, and the correlation identifier from the x-correlation-Id header, and performs application web logging.

Application origin server 170 may leverage the injected custom headers (e.g., the x-forwarded proto, x-forwarded-for, and x-correlationId headers) in the synthetic web request to generate application web server HTTP logs 220. More specifically, application origin server 170 may insert, in logs 220, the protocol obtained from the x-forwarded proto header, the IP addresses obtained from the x-forwarded-for header, and the correlation identifier obtained from the x-correlation-Id header. Synthetic agent 160 may configure logs 220 to include the values of the x-forwarded proto, x-forwarded-for, and x-correlationId headers. In one example, logs 220 may be stored on application origin server 170.

At operation 225, synthetic agent 160 continuously monitors/parses logs 220, extracts the header information (e.g., IP addresses and correlation identifier), and builds a table that records correlated indications of synthetic agent 110, edge node 150(1), the application, application origin server 170, the correlation identifier, and/or other information. For example, application origin server 170 may obtain a plurality of candidate network communications that include the synthetic web request and other, irrelevant requests. The synthetic web request may use HTTP or HTTPS, as indicated in its x-forwarded proto header, whereas the other requests may use, e.g., Secure Shell (SSH) protocol.

To avoid wasting compute/memory resources on extracting and recording information from the irrelevant requests, synthetic agent 160 may filter out, from logs 220, requests that are irrelevant to the end-to-end flow. Synthetic agent 160 may filter the plurality of candidate network communications based on one or more headers in the one or more network communications (e.g., the x-forwarded proto header). In one example, synthetic agent 160 may use the information in logs 220 extracted from the x-forwarded-proto header to determine what kind of request was made. For example, HTTP/HTTPS may indicate that the request is a relevant synthetic web request, whereas SSH may indicate that the request is irrelevant. Thus, synthetic agent 160 may use the x-forwarded-proto header to validate that a given request entry in logs 220 matches an HTTP or HTTPS request.

At operation 230, in response to obtaining the identifier of edge node 150(1) from logs 220, synthetic agent 160 may provide one or more network probes from cloud or datacenter environment 130 to edge node 150(1). The network probe(s) may be tagged with the correlation identifier obtained from logs 220. Cloud or datacenter environment 130 may obtain, from edge node 150(1), telemetry data that is generated responsive to the network probe. The telemetry data may include telemetry data regarding the network path between edge node 150(1) and cloud or datacenter environment 130, such as identifiers of network nodes 180(3) and 180(4), associated latency times, etc.

At operation 235, aggregation server 135, which may also be referred to as a "test controller," may obtain a first set of telemetry (e.g., probe) data from synthetic agent 110, and a second set of telemetry (e.g., probe) data from cloud or datacenter environment 130. The telemetry data obtained from synthetic agent 110 may include data relating to the network path between synthetic agent 110 and cloud edge network 120 (e.g., network nodes 180(1) and 180(2)); the telemetry data obtained from synthetic agent 160 may include data relating to the network path between cloud edge network 120 and cloud or datacenter environment 130 (e.g., network nodes 180(3) and 180(4)). Both sets of telemetry data may be tagged with the same correlation identifier (e.g., 106574).

Based on the telemetry data having a common correlation identifier (e.g., 106574), aggregation server 135 may stitch together both sets of telemetry data to build a full/complete end-to-end distributed network trace. The end-to-end distributed network trace may include the hop-by-hop network path from synthetic agent 110 to cloud edge network 120, as well as the network path from cloud edge network 120 to cloud or datacenter environment 130. The end-to-end distributed network trace may be used to automatically or manually (e.g., by application and network teams) identify network and/or Internet problems that may adversely impact application performance.

In this example, operation 230 involves synthetic agent 160 providing the network probe(s) to edge node 150(1) because the synthetic web request was proxied to edge node 150(1) (i.e., a single edge node); however, it will be appreciated that the synthetic web request sent from synthetic agent 110 may be proxied by any suitable number of edge nodes. For example, if the synthetic web request is proxied by both edge nodes 150(1) and 150(2), then synthetic agent 160 may extract identifiers of both edge nodes 150(1) and 150(2) from logs 220, and provide the network probes to both edge nodes 150(1) and 150(2). Therefore, cloud or datacenter environment 130 may obtain telemetry data (e.g., network path telemetry data) from both edge nodes 150(1) and 150(2) (or any suitable number of edge nodes).

Furthermore, the edge node(s) to which synthetic web requests are proxied may change over time (e.g., from edge node 150(1) to edge node 150(2)). In this example, cloud or datacenter environment 130 may obtain one or more subsequent network communications (e.g., one or more subsequent synthetic web requests) that are similar to the initial synthetic web request, but include an identifier of edge node 150(2) rather than edge node 150(1).

Application origin server 170 may generate subsequent logs (including the identifier of edge node 150(2)) for the subsequent synthetic web request(s). Application origin server 170 may stream the subsequent logs to an automation service (e.g., on synthetic agent 160), and synthetic agent 160 may update the table with the identifier of edge node 150(2). Using the table, synthetic agent 160 may determine whether the identifier of edge node 150(1) (i.e., the previous proxied edge node) is different from the identifier of edge node 150(2) (i.e., the current proxied edge node). In this case, the identifiers are different, which signals that the proxied edge node has changed from edge node 150(1) to 150(2).

In this manner, synthetic agent 160 may continuously track changes in proxied edge nodes over time by recording the proxied edge nodes in the table. The table may dynamically build awareness of the specific IP addresses of the edge nodes in cloud edge network 120 that are sending proxied requests to application origin server 170. Synthetic agent

160 may use the table to automate the configuration and execution of synthetic network tests/probes sent to edge nodes 150(1) or 150(2). For example, synthetic agent 160 may identify which of edge nodes 150(1) or 150(2) sent the proxied synthetic web request, and provide the network probe to that edge node (edge node 150(1) or 150(2)).

Figure 3:
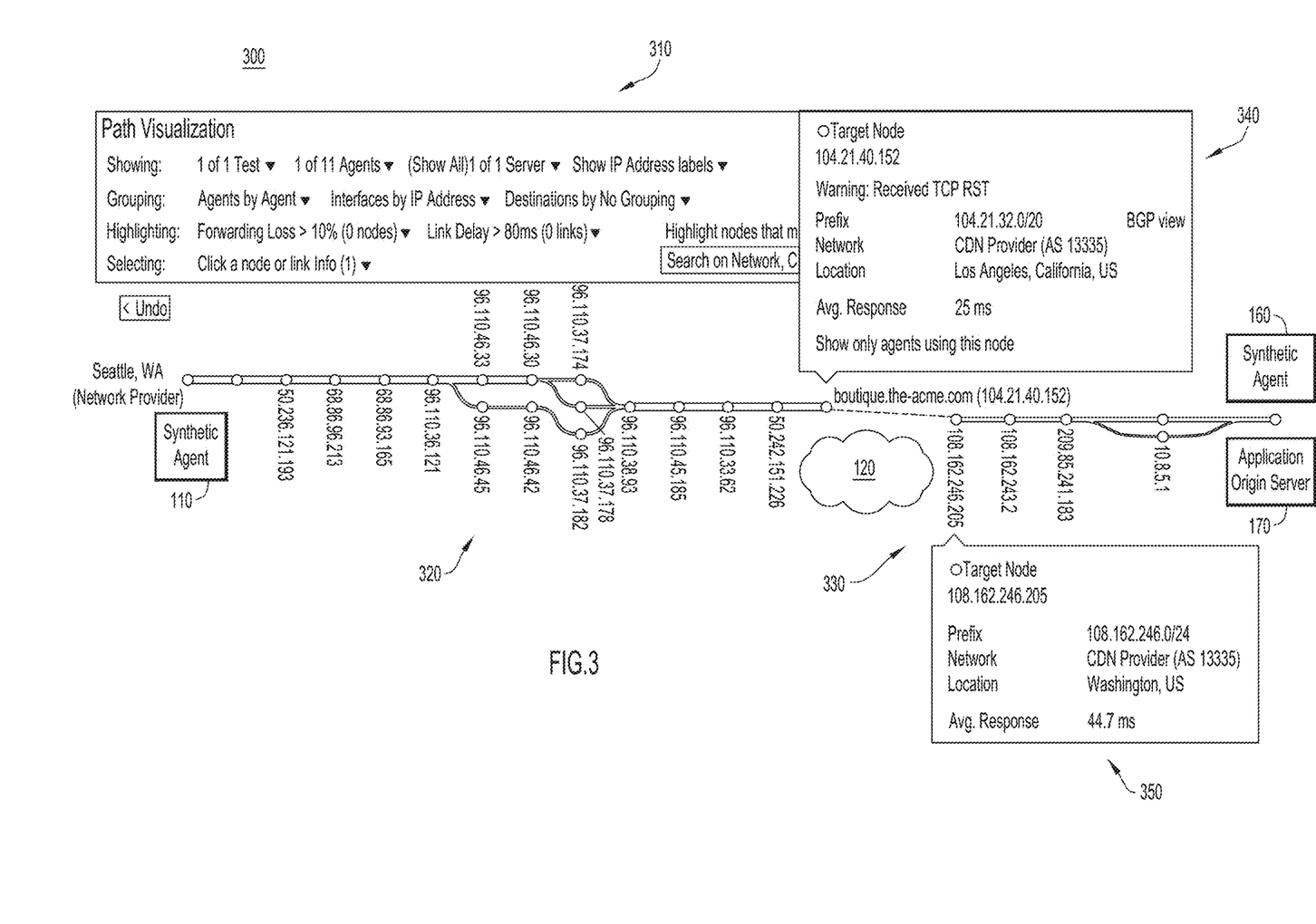
FIG. 3 illustrates a display of an end-to-end distributed network trace, according to an example embodiment.

With continuing reference to FIG. 1, FIG. 3 illustrates a display 300 of an end-to-end distributed network trace, according to an example embodiment. Display 300 includes visualization window 310, network segment 320, network segment 330, and pop-up windows 340 and 350. Visualization window 310 displays settings for visualizing the end-to-end distributed network trace, at least some of which may be user-configurable. Network segments 320 and 330 may, together, form the end-to-end distributed network trace. Network segment 320 (e.g., the segment to the left of cloud edge network 120) may be displayed based on information obtained from synthetic agent 110, and network segment 330 (e.g., the segment to the right of cloud edge network 120) may be displayed based on information obtained from synthetic agent 160.

Display 300 may also be configured to display one or more pop-up windows each providing detailed information regarding a corresponding network entity (e.g., synthetic agent 110 or 160, a network node, an intermediate node, an edge node, etc.). The pop-up windows may appear in response to a user interaction, e.g., in response to a user hovering or selecting/clicking the corresponding graphical depiction of the corresponding network entity. Pop-up windows 340 and 350, for example, correspond to application front door 140 and edge node 150(1), respectively. In this example, application front door 140 has the IP address 104.21.40.152, and edge node 150(1) has the IP address 108.162.246.205.

Figure 4:
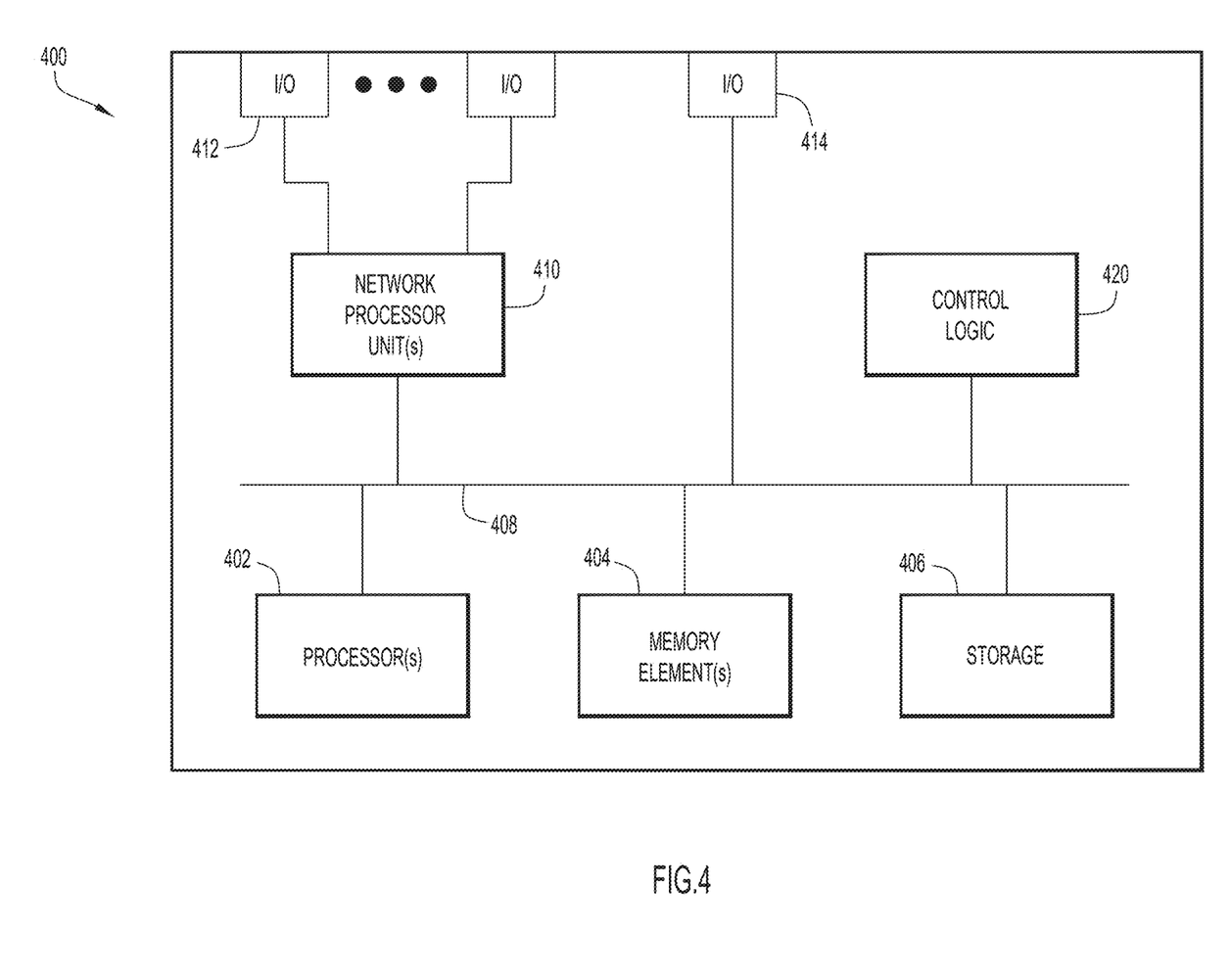
FIG. 4 illustrates a hardware block diagram of a computing device configured to perform functions associated with operations discussed herein, according to an example embodiment.

Referring to FIG. 4, FIG. 4 illustrates a hardware block diagram of a computing device 400 that may perform functions associated with operations discussed herein in connection with the techniques depicted in FIGS. 1-3. In various embodiments, a computing device, such as computing device 400 or any combination of computing devices 400, may be configured as any entity/entities as discussed for the techniques depicted in connection with FIGS. 1-3 in order to perform operations of the various techniques discussed herein.

In at least one embodiment, computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory elements 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) now known or hereafter developed. Thus, the network processor unit(s) 410 and/or network I/O interfaces 412 may include suitable interfaces for receiving, transmitting, and/or otherwise communicating data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device 400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory elements 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 400 for transfer onto another computer readable storage medium.

Figure 5:
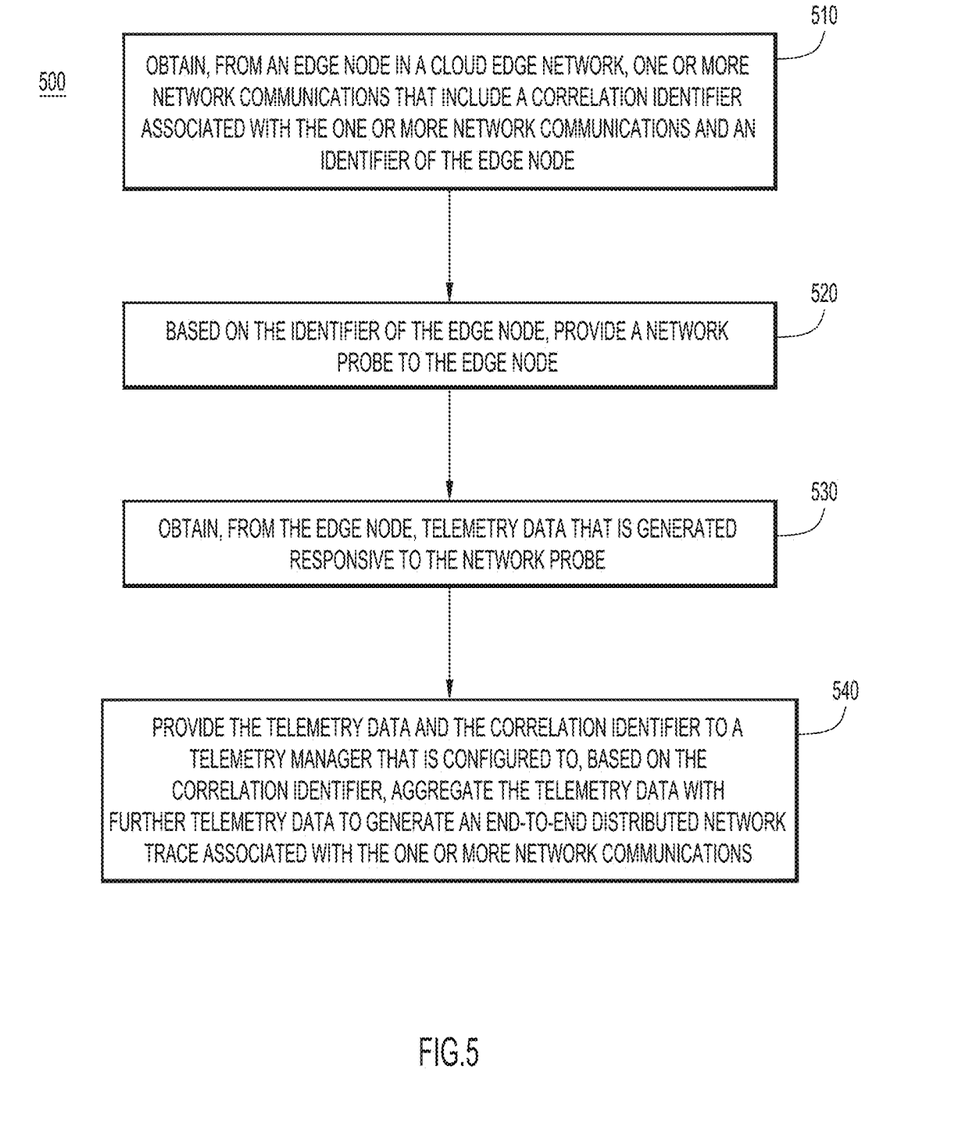
FIG. 5 illustrates a flowchart of a method for performing functions associated with operations discussed herein, according to an example embodiment.

FIG. 5 is a flowchart of an example method 500 for performing functions associated with operations discussed herein. Method 500 may be performed by any suitable entity, such as cloud or datacenter environment 130. At operation 510, cloud or datacenter environment 130 obtains, from an edge node in a cloud edge network, one or more network communications that include a correlation identifier associated with the one or more network communications and an identifier of the edge node.

At operation 520, based on the identifier of the edge node, cloud or datacenter environment 130 provides a network probe to the edge node. At operation 530, cloud or datacenter environment 130 obtains, from the edge node, telemetry data that is generated responsive to the network probe. At operation 540, cloud or datacenter environment 130 provides the telemetry data and the correlation identifier to an aggregation server that is configured to, based on the correlation identifier, aggregate the telemetry data with further telemetry data to generate an end-to-end distributed network trace associated with the one or more network communications.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. IP addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the'(s)' nomenclature (e.g., one or more element(s)).

In one form, a method is provided. The method comprises: obtaining, from an edge node in a cloud edge network, one or more network communications that include a correlation identifier associated with the one or more network communications and an identifier of the edge node; based on the identifier of the edge node, providing a network probe to the edge node; obtaining, from the edge node, telemetry data that is generated responsive to the network probe; and providing the telemetry data and the correlation identifier to an aggregation server that is configured to, based on the correlation identifier, aggregate the telemetry data with further telemetry data to generate an end-to-end distributed network trace associated with the one or more network communications.

In one example, the method further comprises: displaying the end-to-end distributed network trace.

In one example, the method further comprises: recording the identifier of the edge node; obtaining, from an edge node in the cloud edge network, one or more subsequent network communications and an identifier of the edge node from which the one or more subsequent network communications were obtained; and determining whether the identifier of the edge node is different from the identifier of the edge node from which the one or more subsequent network communications were obtained.

In one example, the method further comprises: obtaining, from the edge node, a plurality of candidate network communications; and filtering the plurality of candidate network communications to identify the one or more network communications. In a further example, filtering the plurality of candidate network communications includes: filtering the plurality of candidate network communications based on one or more headers in the one or more network communications.

In one example, obtaining the one or more network communications includes obtaining one or more communications that include the identifier of the edge node in a header.

In one example, the aggregation server is configured to obtain the further telemetry data and the correlation identifier from a synthetic agent that provided the one or more network communications to the edge node.

In one example, the method further comprises: associating metadata of a synthetic agent that provided the one or more network communications to the edge node, with the end-to-end distributed network trace. In a further example, associating the metadata of the synthetic agent with the end-to-end distributed network trace includes: associating a location of the synthetic agent with the end-to-end distributed network trace.

In one example, the method further comprises: based on the telemetry data, automatically implementing a network configuration change in a cloud or datacenter environment configured to perform the obtaining of the one or more network communications, the providing of the network probe, the obtaining of the telemetry data, and the providing of the telemetry data and the correlation identifier.

In another form, an apparatus is provided. The apparatus comprises: a network interface configured to obtain or provide network communications; and one or more processors coupled to the network interface, wherein the one or more processors are configured to: obtain, from an edge node in a cloud edge network, one or more network communications that include a correlation identifier associated with the one or more network communications and an identifier of the edge node; based on the identifier of the edge node, provide a network probe to the edge node; obtain, from the edge node, telemetry data that is generated responsive to the network probe; and provide the telemetry data and the correlation identifier to an aggregation server that is configured to, based on the correlation identifier, aggregate the telemetry data with further telemetry data to generate an end-to-end distributed network trace associated with the one or more network communications.

In another form, one or more non-transitory computer readable storage media are provided. The non-transitory computer readable storage media are encoded with instructions that, when executed by a processor, cause the processor to: obtain, from an edge node in a cloud edge network, one or more network communications that include a correlation identifier associated with the one or more network communications and an identifier of the edge node; based on the identifier of the edge node, provide a network probe to the edge node; obtain, from the edge node, telemetry data that is generated responsive to the network probe; and provide the telemetry data and the correlation identifier to an aggregation server that is configured to, based on the correlation identifier, aggregate the telemetry data with further telemetry data to generate an end-to-end distributed network trace associated with the one or more network communications.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, from an edge node in a cloud edge network disposed between a synthetic agent and a datacenter, one or more network communications that are generated by the synthetic agent with a correlation identifier associated with the one or more network communications and modified by the edge node to include an identifier of the edge node;
   based on the identifier of the edge node, providing a network probe to the edge node;
   obtaining, from the edge node, telemetry data that is generated responsive to the network probe, wherein the telemetry data includes information for one or more network nodes transmitting the one or more network communications between the cloud edge network and the datacenter; and
   providing the telemetry data and the correlation identifier to an aggregation server that is configured to, based on the correlation identifier, aggregate the telemetry data with further telemetry data to generate an end-to-end distributed network trace associated with the one or more network communications from the synthetic agent to the datacenter, wherein the further telemetry data includes information for one or more network nodes transmitting the one or more network communications between the synthetic agent and the cloud edge network.

2. The method of claim 1, further comprising:
   displaying the end-to-end distributed network trace.

3. The method of claim 1, further comprising:
   recording the identifier of the edge node;
   obtaining, from an edge node in the cloud edge network, one or more subsequent network communications and an identifier of the edge node from which the one or more subsequent network communications were obtained; and
   determining whether the identifier of the edge node is different from the identifier of the edge node from which the one or more subsequent network communications were obtained.

4. The method of claim 1, further comprising:
   obtaining, from the edge node, a plurality of candidate network communications; and
   filtering the plurality of candidate network communications to identify the one or more network communications.

5. The method of claim 4, wherein filtering the plurality of candidate network communications includes:
   filtering the plurality of candidate network communications based on one or more headers in the one or more network communications.

6. The method of claim 1, wherein obtaining the one or more network communications includes obtaining one or more communications that include the identifier of the edge node in a header.

7. The method of claim 1, wherein the aggregation server is configured to obtain the further telemetry data and the correlation identifier from the synthetic agent that provided the one or more network communications to the edge node.

8. The method of claim 1, further comprising:
   associating metadata of the synthetic agent that provided the one or more network communications to the edge node, with the end-to-end distributed network trace.

9. The method of claim 8, wherein associating the metadata of the synthetic agent with the end-to-end distributed network trace includes:

associating a location of the synthetic agent with the end-to-end distributed network trace.

10. The method of claim 1, further comprising:
based on the telemetry data, automatically implementing a network configuration change in a cloud or datacenter environment configured to perform the obtaining of the one or more network communications, the providing of the network probe, the obtaining of the telemetry data, and the providing of the telemetry data and the correlation identifier.

11. An apparatus comprising:
a network interface configured to obtain or provide network communications; and
one or more processors coupled to the network interface, wherein the one or more processors are configured to:
obtain, from an edge node in a cloud edge network disposed between a synthetic agent and a datacenter, one or more network communications that are generated by the synthetic agent with a correlation identifier associated with the one or more network communications and modified by the edge node to include an identifier of the edge node;
based on the identifier of the edge node, provide a network probe to the edge node;
obtain, from the edge node, telemetry data that is generated responsive to the network probe, wherein the telemetry data includes information for one or more network nodes transmitting the one or more network communications between the cloud edge network and the datacenter; and
provide the telemetry data and the correlation identifier to an aggregation server that is configured to, based on the correlation identifier, aggregate the telemetry data with further telemetry data to generate an end-to-end distributed network trace associated with the one or more network communications from the synthetic agent to the datacenter, wherein the further telemetry data includes information for one or more network nodes transmitting the one or more network communications between the synthetic agent and the cloud edge network.

12. The apparatus of claim 11, wherein the one or more processors are further configured to:
record the identifier of the edge node;
obtain, from an edge node in the cloud edge network, one or more subsequent network communications and an identifier of the edge node from which the one or more subsequent network communications were obtained; and
determine whether the identifier of the edge node is different from the identifier of the edge node from which the one or more subsequent network communications were obtained.

13. The apparatus of claim 11, wherein the one or more processors are further configured to:
obtain, from the edge node, a plurality of candidate network communications; and
filter the plurality of candidate network communications to identify the one or more network communications.

14. The apparatus of claim 13, wherein the one or more processors are configured to:
filter the plurality of candidate network communications based on one or more headers in the one or more network communications.

15. The apparatus of claim 11, wherein the one or more processors are configured to:
obtain one or more communications that include the identifier of the edge node in a header.

16. One or more non-transitory computer readable storage media encoded with instructions that, when executed by a processor, cause the processor to:
obtain, from an edge node in a cloud edge network disposed between a synthetic agent and a datacenter, one or more network communications that are generated by the synthetic agent with a correlation identifier associated with the one or more network communications and modified by the edge node to include an identifier of the edge node;
based on the identifier of the edge node, provide a network probe to the edge node;
obtain, from the edge node, telemetry data that is generated responsive to the network probe, wherein the telemetry data includes information for one or more network nodes transmitting the one or more network communications between the cloud edge network and the datacenter; and
provide the telemetry data and the correlation identifier to an aggregation server that is configured to, based on the correlation identifier, aggregate the telemetry data with further telemetry data to generate an end-to-end distributed network trace associated with the one or more network communications from the synthetic agent to the datacenter, wherein the further telemetry data includes information for one or more network nodes transmitting the one or more network communications between the synthetic agent and the cloud edge network.

17. The one or more non-transitory computer readable storage media of claim 16, wherein the instructions further cause the processor to:
record the identifier of the edge node;
obtain, from an edge node in the cloud edge network, one or more subsequent network communications and an identifier of the edge node from which the one or more subsequent network communications were obtained; and
determine whether the identifier of the edge node is different from the identifier of the edge node from which the one or more subsequent network communications were obtained.

18. The one or more non-transitory computer readable storage media of claim 16, wherein the instructions further cause the processor to:
obtain, from the edge node, a plurality of candidate network communications; and
filter the plurality of candidate network communications to identify the one or more network communications.

19. The one or more non-transitory computer readable storage media of claim 18, wherein the instructions cause the processor to:
filter the plurality of candidate network communications based on one or more headers in the one or more network communications.

20. The one or more non-transitory computer readable storage media of claim 16, wherein the instructions cause the processor to:
obtain one or more communications that include the identifier of the edge node in a header.

* * * * *